United States Patent [19]

Phadke

[11] Patent Number: 5,008,342

[45] Date of Patent: Apr. 16, 1991

[54] EPOXY CONTAINING IMPACT MODIFIERS FOR THERMOPLASTIC RESINS

[76] Inventor: Shrikant V. Phadke, 14416 Brittmore Ave., Baton Rouge, La. 70817

[21] Appl. No.: 235,364

[22] Filed: Aug. 23, 1988

Related U.S. Application Data

[63] Continuation-in-part of Ser. No. 4,088, Jan. 16, 1987, abandoned.

[51] Int. Cl.[5] .................... C08F 255/02; C08L 51/00; C08L 67/00; C08L 77/00
[52] U.S. Cl. ...................................... 525/263; 525/64; 525/66; 525/181; 525/286
[58] Field of Search .................... 525/181, 286, 64, 66

[56] References Cited

U.S. PATENT DOCUMENTS 3,696,069  10/1972  Schrage et al. .................... 525/74
3,886,227   5/1975  Van Brederode et al. ........... 525/74

FOREIGN PATENT DOCUMENTS 0040154  3/1985  Japan .
8604076  7/1976  World Int. Prop. O. ............ 525/64

Primary Examiner—John C. Bleutge
Assistant Examiner—Vasu S. Jagannathan
Attorney, Agent, or Firm—Rockey and Rifkin

[57] ABSTRACT

An epoxy functionalized copolymer and/or interpolymer rubber prepared in a bulk reaction for use as a modifier for improving the impact and knitline strength of thermoplastic resins.

21 Claims, No Drawings

EPOXY CONTAINING IMPACT MODIFIERS FOR THERMOPLASTIC RESINS

This application is a continuation-in-part of U.S. Patent Application Ser. No. 004,088, filed Jan. 16, 1987, now abandoned and entitled "Epoxy Containing Impact Modifiers For Thermoplastic Resins".

FIELD OF THE INVENTION

This invention relates to modifiers for thermoplastic resins. More particularly, this invention relates to epoxy functionalized elastomeric materials for use as modifiers for thermoplastic resins.

BACKGROUND OF THE INVENTION

Common thermoplastic resins, i.e., polycarbonate, polyester, polyphenylene ether, polyamide, and the like have excellent combinations of properties making them suitable for use as molded articles. Such resins, in general, show good elongation, good tensile strength and good impact, among other properties. However, it is widely recognized that such resins are notch sensitive and subject to brittle failure upon impact due to poor resistance to crack propagation and weakness at the knitline. These flaws in an otherwise excellent spectrum of physical properties greatly restrict the usefulness of articles molded from such resins.

Improving the notch sensitivity, knitline strength and preventing brittle failure upon impact of thermoplastic resins has been the subject matter of considerable research and development. Generally, the problem is addressed by the addition or admixture of additives to the thermoplastic resin which improve notch sensitivity without substantially affecting other properties. The most common type of such additives are rubber-like or elastomeric materials, such as ethylene propylene copolymers (EPM), or ethylene-propylene-polyene terpolymers (EPDM), which form discrete particles dispersed throughout the thermoplastic resin. However, the desired level of improvement has not been achieved with the addition of such rubber-like or elastomeric materials by reason of the relative incompatibility between such rubber-like or elastomeric materials and many thermoplastic resins.

Attempts have been made to overcome this problem and increase the compatibility between the rubber-like or elastomeric materials and thermoplastic resins by modification of the rubber-like or elastomeric materials to provide such with sites that adhere to the thermoplastic resin and thus increase compatibility.

Cope, U.S. Pat. No. 3,435,093, discloses blends of polyethylene terephthalate and an ionic hydrocarbon copolymer of alpha-olefins of the formula $R-CH=CH_2$ in which R is hydrogen (ethylene) or an alkyl radical of 1-3 carbon atoms (propylene-pentene) with the copolymer modified with an alpha-beta ethylenically unsaturated carboxylic acid containing 3-5 carbon atoms. The Cope patent does not teach or suggest the components of the additive employed in the practice of the invention described and claimed herein, as will hereinafter appear.

The problem was faced directly in the Epstein U.S. Pat. No. 4,172,859, issued Oct. 30, 1979. The Epstein patent is somewhat confusing in that it seeks to cover the waterfront by listing an endless number of materials and combinations thereof for use as additives to improve the toughness and impact strength of polyester and polycarbonate resins. In the Epstein patent, stress is placed on the particle size and tensile modulus of the copolymer additive. While Epstein contemplates the use of ethylene-propylene copolymers and ethylene-propylene-polyene terpolymers from amongst the large number of other varieties of materials and the use of alpha-beta ethylenically unsaturated carboxylic and dicarboxylic acids and anhydrides as modifying agents to provide sites which adhere to the matrix resin, the Epstein patent does not recognize the concepts of the invention described and claimed as will hereinafter be pointed out.

In the copending application Ser. No. 690,613, filed Jan. 11, 1985, and entitled "Polyesters Having Improved Impact Strength", of which this is an improvement, the invention described therein is based on the thought that an ethylene, $C_3-C_{16}$ mono-olefin, polyene and preferably an ethylene, propylene, diene rubbery interpolymer would make a good impact modifier for thermoplastic polyester, if the two could be made compatible. The two are relatively incompatible because the rubber is a hydrocarbon while the polyester is a much more polar substance. Thus, the objective of the invention described and claimed therein was addressed to the modification of the ethylene, mono-olefin, polyene interpolymer rubber greatly to improve its compatibility with polyester to provide an improved impact modifier for the thermoplastic polyester resin.

Briefly described, the features of the invention of the copending application are embodied in a composition comprising 60-90 percent by weight of a matrix resin in the form of a polyester blended with 10-40 percent by weight of an unsaturated rubber formed by copolymerization of ethylene, one or more mono-olefins and one or more polyenes in which the backbone unsaturated rubber component has been modified with an ester of an alpha-beta-unsaturated acid having an epoxide functionality on the alkoxy portion, such as the ester derived from methacrylic acid and an epoxy alcohol and which attaches to the backbone rubber chiefly by way of a grafting reaction with little if any cross-linking reaction.

Copending application Ser. No. 800,333, filed Nov. 21, 1985 and entitled "Polyesters Having Improved Impact Strength", describes an improvement over the invention described and claimed in the aforementioned copending application Ser. No. 690,613 in that controlled cross-linking of the rubber backbone phase (EPDM) of the grafted modifier provides a significant improvement in the knitline strength of the final blend with the matrix (polyester or polyamide) resin, when the cross-linking reaction is carried out after proper dispersion of the grafted rubber phase in the plastic matrix resin and when the cross-linking is concentrated between the rubber phase of the grafted rubber. For this purpose, use is made of a cross-linking agent in the form of a compound having functionalities capable of reaction with the grafted rubber, such as diacids or corresponding dianhydrides and/or diamines such as hexamethylene diamine, (HDA), melamine, benzophenone, tetracarboxylic dianhydride, adipic acid, maleic acid, maleic anhydride and the like.

Reference is also made to the following pertinent prior art patents: U.S. Pat. No 3,886,227, issued May 27, 1975, and U.S. Pat. No. 4,026,967 (Flexman et al.), issued May 31, 1977. These patents seek to avoid the type of cross-linking of the modifier of this invention and they are further deficient from the standpoint of the characteristics of the modifier described and claimed herein from the standpoint of gel content, epoxide functionality and degree of graft. Though less pertinent, the following patents may be included with the above, namely: U.S. Pat. Nos. 3,884,882; 3,274,289; 3,484,403; 3,882,194; 4,017,557; 4,147,740; 4,346,194; 3,376,182 and Japanese Patent No. 45-30943.

DETAILED DESCRIPTION OF THE INVENTION

Briefly described, the concepts of this invention are embodied in a modifier for improving the impact and knitline strength of a thermoplastic matrix resin in which the modifier is blended for dispersion in the matrix resin. In accordance with the practice of this invention, the modifier comprises an ethylene-mono-olefin backbone rubber and/or an ethylene-mono-olefin polyene interpolymer rubber subjected to a reaction with free radical polymerizable monomers having an epoxide functionality wherein the reaction is carried out at an elevated temperature in bulk in the presence of a peroxide catalyst. The reaction product is characterized by a gel content within the range of 5-100 percent and preferably 7-65 percent, an epoxy functionality of more than 2.5 per 1000 carbon atoms up to about 13 per 1000 carbon atoms and a degree of graft within the range of 2.5-8 percent.

When the reaction is carried out in bulk, at an elevated temperature, in the presence of a peroxide catalyst, a modifier having the described characteristics can be produced with a backbone formed by copolymerization of ethylene and one or more $C_3$-$C_{16}$ mono-olefins, preferably propylene (EPM) or preferably a rubber formed by interpolymerization of ethylene, one or more mono-olefins having from 3-16 carbon atoms, preferably propylene, and one or more polyenes (EPDM). In the practice of this invention, the EPDM component can be substituted in whole or in part by an EPM rubber.

As the copolymer rubber, use can be made of an ethylene-mono-olefin and preferably an ethylene-propylene copolymer (EPM) rubber formed by copolymerization in solvent solution, in the presence of a Ziegler-type catalyst, of ethylene and one or more mono-olefins, preferably propylene, but which may include 1-butene, 1-pentene, or other mono-olefins having 3-12 carbon atoms. The ratio of ethylene to propylene or other $C_3$-$C_{12}$ mono-olefin may range from 10-95 moles of ethylene to 90-5 moles of propylene or other mono-olefins. The preferred range of ethylene to propylene or other mono-olefin is 45-75 moles of ethylene to 55-25 moles of propylene or other mono-olefin.

In the preparation of the interpolymer rubber, the polyene monomer containing a plurality of carbon-to-carbon double bonds may be selected from those disclosed in the prior art for use as third monomers in the preparation of ethylene-mono-olefin-polyene terpolymers, including open chain polyunsaturated hydrocarbons containing 4-20 carbon atoms, such as 1,4-hexadiene, monocyclic polyenes and polycyclic polyenes. The polyunsaturated bridged ring hydrocarbons or halogenated bridged ring hydrocarbons are preferred. Examples of such bridged ring hydrocarbons include the polyunsaturated derivatives of bicyclo (2,2,1) heptane wherein at least one double bond is present in one of the bridged rings, such as dicyclo-pentadiene, bicyclo(2,2,1)hepta-2,5-diene, the alkylidene norbornenes, and especially the 5-alkylidene-2-norbornenes wherein the alkylidene group contains 1-20 carbon atoms and preferably 1-8 carbon atoms, the alkenyl norbornenes, and especially the 5-alkenyl-2-norbornenes wherein the alkenyl group contains about 3-20 carbon atoms and preferably 3-10 carbon atoms. Other bridged ring hydrocarbons include polyunsaturated derivatives of bicyclo(2,2,2) octane as represented by bicyclo(3,2,1) octane, polyunsaturated derivatives of bicyclo(3,3,1) nonane, and polyunsaturated derivatives of bicyclo(3,2,2) nonane.

Specific examples of preferred bridged ring compounds include 5-methylene-2-norbornene, 5-ethylidene-2-norbornene, 5-n-propylidene-2-norbornene, 5-isobutylidene-2-norbornene, 5-n-butylidene-2-norbornene, dicyclopentadienes; the methyl butenyl norbornenes such as 5-(2-methyl-2-butenyl)-2-norbornene or 5-(3-methyl-2-butenyl)-norbornene, and 5-(3,5-dimethyl-4-hexenyl)-2-norbornene. The elastomer prepared from 5-ethylidene-2-norbornene is much preferred as it has outstanding properties and produces many unusual and unexpected results.

The EPDM backbone rubber may contain chemically bound therein molar ratios of ethylene to propylene or other $C_3$-$C_{16}$ mono-olefin varying between 95:10 to 5:90 ethylene: propylene, and preferably between 70:30 to 55:45 ethylene:propylene. The polyene or substituted polyene may be chemically bound therein in an amount of 0.1 to 10 mol percent, and preferably 0.3 to 1 mol percent. The level of unsaturation in the backbone rubber may range from 2-20 double bonds per 1000 carbon atoms in the polymer chain.

The polymerization reaction for preparation of the rubbery components is carried out in the presence of a catalyst in a solvent medium. The polymerization solvent may be any suitable inert organic solvent that is liquid under reaction conditions. Examples of satisfactory hydrocarbon solvents include straight chain paraffins having from 5-8 carbon atoms, with best results often being secured by the use of hexane; aromatic hydrocarbons and preferably an aromatic hydrocarbon having a single benzene nucleus, such as benzene, toluene and the like; and saturated cyclic hydrocarbons having boiling point ranges approximately those of the straight chain paraffin hydrocarbons and aromatic hydrocarbons described above, and preferably saturated cyclic hydrocarbons having 5-6 carbon atoms in the ring nucleus. The solvent selected may be a mixture of one or more of the foregoing hydrocarbons and preferably a mixture of aliphatic and naphthenic hydrocarbons having approximately the same boiling range as normal hexane. It is desirable that the solvent be dry and free of substances that will interfere with the Ziegler-type catalyst used in the polymerization reaction.

The interpolymerization is carried out in the presence of a Ziegler catalyst of the type well known to the prior art. Such Ziegler-type catalysts are disclosed in a large number of patents, such as U.S. Pat. Nos. 2,933,480; 3,093,620; 3,093,621; 3,211,709 and 3,113,115. Examples of Ziegler catalysts include metal organic coordination catalysts prepared by contacting a compound of a heavy metal of the group IV-a, V-a, VI-a and VII-a of the Mendeleeff periodic system of elements, such as titanium, vanadium and chromium halides with an organo-metallic compound of a metal of groups I, II or III of the Mendeleeff periodic system which contains at least one carbon-metal bond, such as trialkyl aluminum, and alkyl aluminum halides in which the alkyl groups contain from 1-20 and preferably 1-4 carbon atoms.

The preferred Ziegler catalyst is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are especially preferred include alkyl aluminum chlorides of U.S. Pat. No. 3,113,115, having the general formula $R_1AlCl_2$ and $R_2AlCl$ and the corresponding sesquichlorides of the general formula $R_3Al_2Cl_3$, in which R is methyl, ethyl, propyl, butyl or isobutyl. In the catalyst system, the aluminum to vanadium mol ratio of the aluminum and vanadium compounds may be within the range of 5/1 to 200/1 and preferably within the range of 15/1 to 60/1, with best results being secured in the ratio of 40 aluminum to 1 vanadium. These same ratios apply with respect to corresponding compounds of others of the heavy metals substituted for the vanadium compound and the organometallic compounds of groups I, II and III for the aluminum compounds. A catalyst prepared from alkyl aluminum sesquichloride, such as the methyl or ethyl aluminum sesquichloride and vanadium oxychloride is preferred in the ratio of 1 mole vanadium oxychloride per 5-300 moles of aluminum and more preferably 15-60 moles of aluminum, with 40 moles of aluminum per mole of vanadium yielding the best results.

The polymerization is preferably carried out on a continuous basis in a reaction vessel closed to the outside atmosphere, which is provided with an agitator, cooling means and conduit means for continuously supplying the ingredients of the reaction including monomer, catalyst and accelerators and conduit means for continuously withdrawing solution containing elastomer, and the catalyst is killed by the addition of a catalyst deactivator.

The preparation of EPM and EPDM polymers is well known and is fully described in such patents as U.S. Pat. Nos. 2,933,480; 3,093,621, 3,211,709, 3,646,168; 3,790,519; 3,884;993; 3,894,999 and 4,059,654, amongst many others.

The epoxy functionality may be described as a monovalent compound of the general formula:

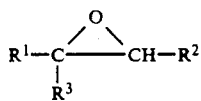

I wherein $R^3$ is hydrogen or methyl; $R^2$ is hydrogen or alkyl having from one to about six carbon atoms; and $R^1$ is alkylene having one to ten carbon atoms. Preferably, $R^1$ is methylene, $R^2$ is hydrogen and $R^3$ is hydrogen, i.e., glycidyl. The above epoxy functionality of Formula I may be joined to the alpha-beta ethylenically unsaturated portion of the monomer, that is capable of free radical polymerization, through any number of organic groups including a carbon-to-carbon bond, through an amide group, through an ether linkage, or through an ester linkage. Suitable epoxy functional graft monomers are glycidyl ethers of unsaturated alcohols, i.e., allylglycidyl ether, methallyl-glycidyl ether; glycidyl esters of unsaturated carboxylic acids, i.e., glycidyl-2-ethyl acrylate, glycidyl-2-propyl acrylate, glycidyl acrylate; glycidyl ethers of alkenylphenols, i.e., isopropenylphenyl-glycidyl ethers; vinyl and allyl esters of epoxy carboxylic acids, vinyl esters of epoxidized oleic acid; and the like. Preferred as the graft monomer herein is glycidyl methacrylate (GMA).

Of course, the chain formed by the interpolymerization reaction process need not be a homopolymer or even be of entirely epoxy functional graft monomers. For example, combinations of the above epoxy functional graft monomers may be used as well as combinations of such with other free radical polymerizable ethylenically unsaturated monomers. Other such monomers suitable for use as comonomers are the alk-1-enes, including allyl compounds, acrylates and alkyl acrylates, methacrylates and alkyl methacrylates, acrylonitrile, methacrylonitrile, styrenes, and vinyl halides. A particularly useful such comonomer is a glycidyl acrylate and methyl methacrylate.

It is critical to the present invention that the gel content of the elastomeric material be controlled either during polymerization or in subsequent processing to achieve a value of greater than about 5 percent by weight and preferably greater than about 10 percent by weight. Gel content may range up to about 100 percent by weight.

Gel content, according to ASTM D3616, is measured by the weight percent of remaining elastomeric material after extraction in hexane or toluene. Gel content is an indication of the degree of cross-linking in the elastomeric material. Persons skilled in the art are familiar with a variety of ways to control the degree of cross-linking and thus the gel content. The cross-link reaction may be a direct rubber backbone to rubber backbone joining, an epoxy functionality to epoxy functionality or rubber backbone joining, or a graft chain free radical addition to a second chain or to a rubber backbone. Further, cross-linking may be achieved by the addition of a cross-linking agent to effectively achieve any of the above reactions. Thus, any of several steps to control gel content may be taken. Thermal aging will increase gel content. Increasing the amount of epoxy functional monomer will increase gel content. Increasing the amount of polyene monomer in the rubber backbone will increase gel content. The addition of a cross-linking agent will increase gel content. The use of monomers with greater tendency to cross-link will increase gel content, for example, a homopolymer graft of glycidyl acrylate will cross-link more readily than a homopolymer of glycidyl methacrylate or a copolymer of glycidyl acrylate and methyl methacrylate.

As stated above, gel content of the elastomeric material may range up to about 100 percent by weight. However, persons skilled in the art will readily understand that cross-linking can be carried on well past the 100 percent by weight gel content level. However, such high levels of cross-linking will destroy the rubbery characteristic of the elastomeric material and lead to a brittle network polymer. Also, high levels of localized cross-linking will create brittle areas within the elastomeric material which will decrease rubbery character. It is apparent that cross-linking should be kept to the minimum required to achieve the desired given gel content. Further, such cross-linking should be uniformly dispersed through the elastomeric material.

The reaction is carried out in accordance with the preferred practice of this invention in a single step bulk process wherein the separate ingredients forming the modifier are combined for reaction in a melt processing piece of equipment, such as an injection machine, Banbury, and the like heat processing equipment at a temperature within the range of 350°-550° F. and preferably 400°–450° F. This permits a different reaction between the ingredients whereby a more desirable and uniform system is obtained which functions more effectively in the final combination with the matrix resin to yield products molded therefrom, having improved properties.

The reaction is carried out in the presence of a peroxide catalyst such as a dialkyl peroxide, dicumyl peroxide, t-butyl hydroperoxide, benzoyl peroxide, t-butylperoctanoate, di-t-butylperoxide, t-butylhydroperoxide, cumene hydroperoxide, t-butylperbenzoate, 2,5-dimethyl-2,5-di(t-butylperoxy) hexane, or other free radical source capable of hydrogen abstraction, as represented by alkyl peroxy esters, alkyl peroxides, alkyl hydroperoxides, diacylperoxides and the like, which is added, in bulk, to the reaction chamber. In order to achieve a desired level of gel content, it is desirable to make use of an initiator in an amount of at least about 0.3 percent by weight of the unsaturated rubber. While more than 3 percent by weight initiator can be used to achieve the desired gel content, it is preferred to limit the upper range to about 3 percent by weight of the unsaturated rubber. A higher amount of catalyst is desired to achieve the level of gel content when the reaction is carried out in solution for production of the impact modifier, while the desired level of gel content can be achieved at lower levels of catalyst or initiator when the reaction is carried out in bulk. An amount of catalyst less than 0.3 percent by weight of the rubbery component, can be used, but the amount of working required for gel formation results in an undesirable amount of degradation of the backbone rubber.

The modifier, produced in accordance with this invention, enjoys improved compatibility with the matrix resin subsequently blended therewith to provide a more uniform product.

In use, the modifier of this invention is physically dispersed in a thermoplastic polymer melt to form discrete particles of modifier in a continuous phase of a thermoplastic matrix resin or blend. At least an impact strength-improving amount of modifier is dispersed in the matrix resin. Generally, this requires that the modifier constitute at least 2 parts by weight per 100 weight parts total thermoplastic content, including the modifier material. The matrix resin may contain elastomeric material up to the point of phase inversion, that is, where the elastomeric material becomes the continuous phase. However, where a rigid article is to be molded from a molding composition containing modifier, the molding composition should contain no more than about 40 parts by weight modifier per 100 weight parts total thermoplastic content. The dispersion is simply carried out by standard techniques, for example, by simple melt blending or dry mixing and melt extruding at an appropriate elevated temperature for any given thermoplastic matrix. The resultant admixture is then molded into a thermoplastic piece of specific dimensions or further extruded into a film or sheet product.

An important concept of this invention resides in the inclusion of a fraction of a polyester matrix resin as a fourth component for concurrent reaction with the EPDM, methacrylate and/or acrlyate and initiator to produce what can be referred to as a masterbatch adapted subsequently to be blended with the remainder of the matrix resin as illustrated in Examples 6–9 of the application. In the absence of the small amount of the polyester (matrix) resin, the impact modifier tends to agglomerate making it difficult in subsequent processing or handling, measuring and mixing the impact modifier with the matrix resin for uniform dispersion therein. The inclusion of a fraction of the polyester resin as a fourth component in the reaction results in a friable product that can be easily reduced to particle s for better handling and distributing in subsequent processing steps.

In addition, it has been found that the presence of a small amount of the matrix resin as a component of the reaction, results in a reaction which differs somewhat from the reaction that takes place in the absence of the polyester and results in a masterbatch which appears to provide for a better blend with the matrix resin with which it is subsequently combined to provide an improved thermoplastic composition having improved properties.

The described improvements can be achieved when the reaction is carried out in combination in which 10–80 percent by weight and preferably 20–50 percent by weight of the total amount of polyester or other matrix resinous component of the final blend product. This intermediate, which contains a part of the matrix resin as a fourth component of the reaction, is referred to herein as a masterbatch with which the remainder of the matrix resin is blended. Optimum results are secured when the unsaturated rubber component (EPDM) and matrix resin (polyester) are present in the masterbatch in the weight ratio of 50–80 parts by weight of the rubber polymer to 50–20parts by weight of the matrix resin, and preferably 60–80 parts by weight of the rubbery polymer to 40–20 parts by weight matrix resin.

Suitable thermoplastics for use as the masterbatch or matrix resin herein are epoxy resins, polyolefins, polyimides, polyaryl ethers, polyphenylene sulfides, polysulfones, polycarbonates, polyesters, polyphenylene ethers, polyamides and the like, including blends thereof. Applicant contemplates that there may be present in an elastomeric material/thermoplastic resin blend the adhesion reaction product of the epoxy functionality of the elastomeric material and a hydroxy, carboxy, or amine functionality (including reactive derivatives thereof, i.e., ester, salt, ether, etc.) of the matrix resin or concentrate resin. It would be preferred that the matrix resin and especially the masterbatch have terminal or mid-chain hydroxy, carboxy, or amine functionalities, including reactive hydroxy or carboxy derivatives, to permit the adhesion reaction. Thus, preferred matrix resins and especially preferred concentrate resins are polyamides, polyesters, polycarbonates, polyphenylene ethers, and polyimides containing phthalic acid or phthalic anhydride terminal groups. It is immediately obvious that a concentrate resin having hydroxy or carboxy functionality could be employed to increase compatibility of the elastomeric material to a second matrix resin where such concentrate is more compatible with the matrix resin than is the elastomeric material.

The polyesters suitable for use herein may be any of the linear or branched saturated polyesters known to those skilled in this art. Generally, the polyesters will comprise linear saturated polyesters derived from $C_1$–$C_{10}$ alkylene glycols such as ethylene glycol, propylene glycol, 1,4-butanediol, etc., including cycloaliphatic glycols, such as 1,4-cyclohexane-dimethanol, and mixtures of any of these glycols with one or more aromatic dicarboxylic acids. Preferably, the polyesters will comprise poly($C_1$–$C_6$ alkylene terephthalates) prepared by known techniques, such as the transesterification of esters of terephthalic acid alone or mixtures of esters of terephthalic acid and isophthalic acid, with the glycol or mixture of glycols and subsequent polymerization, by heating the glycols with the free acids or with halide derivatives thereof, and similar processes. These methods are described in U.S. Pat. Nos. 2,465,319 and 3,047,539 incorporated herein by reference, and elsewhere. In addition, blends of one or more of these polyesters or copolyesters may be employed. A suitable poly(1,4-butylene terephthalate) resin is commercially available from General Electric Company under the trade designation, VALOX® 315; and Poly(ethylene terephthalate) resins are also extremely well known and are abundantly available commercially.

Suitable polycarbonate resins for use herein may be prepared by reacting a dihydric phenol with a carbonate precursor, such as phosgene, holoformate or a carbonate ester. Typically, such polycarbonate will have recurring structural units of the formula:

wherein A is a divalent aromatic radical of the dihydric phenol employed in the polymer producing reaction. Preferably, the aromatic carbonate polymers have an intrinsic viscosity ranging from 0.30 to 1.0 dl./g. (measured in methylene chloride at 25° C.). By dihydric phenols is meant mononuclear or polynuclear aromatic compounds containing two hydroxy radicals, each of which is attached to a carbon atom of an aromatic nucleus. Typical dihydric phenols are bisphenols joined by an alkylene radical, an ether link, or a sulfur link. Preferred bisphenols include 2,2-bis-(4-hydroxyphenyl)-propane; 2,2-bis-(3,5-dimethyl-4-hydroxyphenyl)propane; 4,4'-dihydroxy-diphenyl ether; bis(2-hydroxyphenyl)methane; mixtures thereof and the like. The preferred aromatic carbonate polymer for use herein is a homopolymer derived from 2,2-bis(4-hydroxyphenyl)propane, i.e., bisphenol-A. Polycarbonates suitable for use herein, including methods of polymerization, and a further disclosure of monomer constituents, are described in U.S. Pat. Nos. 2,999,835; 3,028,365; 3,334,154; 4,131,575; 4,018,750 and 4,123,436 which are incorporated herein by reference.

Included within the polycarbonate resins herein are the poly(ester-carbonates). In addition to the dihydric phenol and carbonate precursor as described above, poly(ester-carbonate) is polymerized from an aromatic dicarboxylic acid, such as, for example, iso- or terephthalic acid. The preparation of the poly(ester-carbonates) is described in U.S. Pat. Nos. 3,030,331; 3,169,121; 3,207,814; 4,194,038 and 4,156,069 which are incorporated herein by reference.

Also suitable for use herein are the polyphenylene ether compounds. Such compounds are generally produced by the oxidative coupling of phenol compounds by oxygen or oxygen-containing gas in the presence of a catalyst to produce homopolymers and copolymers of, for example, poly(2,6-diphenyl-1,4-phenyl)ether; poly(2,6-dichloro-1,4-phenylene)ether; and the like. An especially preferred family of polyphenylene ethers include homopolymers and copolymers of those having a $C_1$ to $C_4$ alkyl substitution in the two positions ortho to the oxygen ether atom. Illustrative members of this class are poly(2,6-dimethyl-1,4-phenylene)ether; poly(2,6-diethyl-1,4-phenylene)ether; poly(2,6-dipropyl-1,4-phenylene)ether; poly(2-ethyl-6-propyl-1,4-phenylene)ether; and the like. The most preferred polyphenylene ether is poly(2,6-dimethyl-1,4-phenylene)ether.

Polyphenylene ethers are well known in the art and may be prepared by any number of catalytic and non-catalytic processes from corresponding phenols or reactive derivatives thereof. Examples of polyphenylene ethers and methods for their production are disclosed in U.S. Pat. Nos. 3,306,874; 3,306,875; 3,257,357; 3,257,358; 3,337,501 and 3,787,361, all incorporated herein by reference.

Polyimides suitable for use herein are the reaction products of a dianhydride and a diamine. Preferred dianhydrides are the bis(aromatic anhydrides), particularly the bis(aromatic ether anhydrides). Preferred diamines are aromatic diamines and bis(aromatic amine). Suitable polyimides and means for their production are shown in U.S. Pat. No. 4,024,101.

Marked improvement in impact and knitline strength is experienced by blends of the impact modifiers of this invention with polyamide resins. As used herein, the term "polyamide resin" includes all polymers having recurring carbonamide groups in the main chain, and having molecular weights greater than 2000. "Molecular weight", as used herein, refers to number average molecular weight for polyamides (see Flory, "Principals of Polymer Chemistry", page 273, published 1953 by Cornell University Press).

The polyamide resin is ordinarily produced by condensation of equimolar amounts of dicarboxylic acid or acid derivative containing from two to twenty carbon atoms with a diamine, containing from two to fifteen carbon atoms, or by lactam polymerization according to well known techniques. Preferred polyamides are those based on lactams and those based on aliphatic diamines condensed with aliphatic or aromatic diacids. Included in this group are polyhexamethylene adipamide (nylon 6,6), polycaprolactam (nylon 6), poly(undecaneamide) (Nylon 11), polyhexamethylene sebacamide (Nylon 6,10), polyhexamethylene isophthalamide, polyhexamethylene tereco-isophthalamide, and mixtures or copolymers thereof.

Similar polyamides have been marketed by Allied Corporation under the trade name Capron 8202C and under the designations LSM and BAT and by Firestone Rubber Company under the trade name 228-001 (low viscosity) and with the suffix HS, which means heat stabilized.

The blends described may be used alone as molding pellets or mixed with other polymers, and may contain fillers such as glass fibers, mica, and the like, as well as pigments, dyes, stabilizers, plasticizers, and the like.

In the aforementioned copending applications, the ingredients forming the modifiers described therein are combined by first reacting the olefinic components in the presence of a Ziegler-type catalyst to form a backbone rubber which is subsequently grafted with the component containing the epoxide functionality by a grafting reaction carried out in solvent solution. An important feature of this invention resides in the discovery that considerable improvement in the characteristics of the modifier is achieved when the ingredients making up the modifier are combined in a single step bulk reaction. This not only provides a less expensive and simpler route for producing a modifier, but unexpectedly it provides the opportunity to achieve a desired degree of epoxide functionality as well as a desired gel level which are outside the domain of the aforementioned solution polymerization process. The result is a matrix resin blend having improved knitline strength, an important property in products molded thereof.

The invention hereof is further distinguished over the art previously described in the use of a peroxide catalyst in the bulk process, especially in the presence of unsaturated groupings in the reaction components whereby an improved level of desirable cross-linking is obtained, an instrumental factor in the improvement in knitline strength that is achieved in the moldings formed of the blends. The prior art has sought to minimize cross-linking since such cross-linked modifiers were thought to be undesirable.

The invention will hereinafter be described by way of the following examples, which are given by way of illustration and not by way of limitation. Products of various of the examples were subjected to one or more of the following test procedures:

Degree of Graft: (DOG) was determined by IR using a calibrated curve of values obtained by IR versus those obtained by filtration. The calibrated curve was generated on the basis of the data on solution polymers.

Gel Determination: One gram of finely divided polymer was shaken with 100 ml. toluene for 4 hours at room temperature. Undissolved polymer was filtered out through glass wool. Percent solids in filtrate was determined and gel (% insolubles) was determined by difference. ASTM D3616.

Notched Izod impact strength was measured according to ASTM D256.

Knitline Izod impact strength was measured on unnotched double-gated samples. Except for this variation, the procedure was similar to ASTM D256.

Tensile strength was measured according to ASTM D256.

RSV: Reduced solution viscosity—measured in a 0.1% solution of decalin at 135° C.

Mooney Viscosity: ASTM D1646, ML+4 (125° C.).

Unnotched Double Gate Izod Impact—is a variation of ASTM D256 wherein the test piece is double-gate injection molded from opposite ends under conditions which center the tack line between the ends of the test piece.

Procedure

Blends containing 20 percent by weight modifier and 80 percent VALOX 315 (a poly(1,4-butylene terephthalate), manufactured by the General Electric Company under the trade name VALOX 315) were prepared using three extrusions through a one-inch single screw extruder (Killion) having an L/D ratio of 20/1. Temperatures used for extrusion were: Zone 1—450° F., Zone 2—450° F., Die—425° F. The extruded strands were air-cooled and chopped into pellets. The pellets were molded into test specimens for tensile and notched Izod impact strengths, using a plunger injection molder with a cavity temperature of 530–540° F. and a mold temperature of 200° F. The knitline impact strength samples were molded, using a double-gated mold on a screw injection molder. The molded test specimens were stored in moisture proof polyethylene bags for at least 16 hours prior to testing.

EXAMPLE 1

A 2.2 RSV, 66/34 (molar ratio) ethylene-propylene, 8 weight percent ethylidene norbornene EPDM polymer (EPsyn ® 55, Copolymer Rubber & Chemical Corporation) containing 9 carbon-to-carbon double bonds (C=C) per 1000 carbon atoms was fed with a screw feeder (K-tron Corporation) into a co-rotating twin-screw extruder (Werner & Pfleiderer Corporation's ZSK-30, 12 barrels) at a rate of 4.6 lbs/hr. The temperature set points on the extruder were: Zone 1: 70° C., all other Zones: 200° C. A 10/1 (wt/wt) mixture of glycidyl methacrylate/2,5-dimethyl-2,5 di(t-butylperoxy) hexane was fed at the rate of 0.385 lbs/hr. in the third barrel of the extruder. The extrudate was cooled in a water bath and pelletized. The pellets were dried for 4 hours at 70° C. The dry pellets had a degree of graft of 5.86 and toluene gel of 17%.

EXAMPLE 2

Same as Example 1, except the rubber feed rate was 6.3 lbs/hr. and the monomer/initiator feed rate was 0.3 lbs/hr. The dry pellets had a degree of graft of 4.03 and toluene gel of 14%.

EXAMPLE

Same as Example 1, except the rubber feed rate was 6 lbs/hr. and the monomer/initiator feed rate was 0.214 lbs/hr. The dry pellets had a degree of graft of 2.5 and toluene gel of 12%.

EXAMPLE 4

Same as Example 1, with the following exceptions:
(a) The rubber was a 2.5 RSV 66/34 (molar ratio) ethylene/propylene, 4.5 weight percent ethylidene norbornene EPDM (EPsyn 70A, Copolymer Rubber and Chemical Corporation).
(b) The rubber feed rate was 5.7 lbs/hr.
(c) The monomer/initiator feed rate was 0.5 lbs/hr.

The dry pellets had a degree of graft of 4.8 and toluene gel of 65%.

EXAMPLE 5

Same as Example 1, with the following exceptions:
(a) The rubber was a 2.2 RSV 83/17 (molar ratio) ethylene/propylene, 4.5 weight percent ethylidene norbornene EPDM (EPsyn E-901, Copolymer Rubber and Chemical Corporation).
(b) The rubber feed rate was 6 lbs/hr.
(c) The monomer/initiator feed rate was 0.45 lbs/hr.

The dry pellets had a degree of graft of 4.2 and toluene gel of 11%.

EXAMPLE 6

The following composition was mixed in a Brabender Plasticorder for 5 minutes at 200° C. using cam blades at 40 RPM: 60 gms of a 2.2 RSV, 66/34 (molar ratio) ethylene/propylene, 8 weight percent ethylidene norbornene EPDM (EPsyn 55, Copolymer Rubber & Chemical Corporation) plus 4.2 gms of glycidyl methacrylate plus 0.42 gms of 22,5-dimethyl-2,5 di(t-butylperoxy) hexane. The resultant product was ground in a blender. The degree of graft was 4.5.

EXAMPLE 7

Same as Example 6, except the rubber used was a 1.9 RSV, 60/40 (molar ratio) ethylene/propylene, 0.5 weight percent vinyl norbornene (EPsyn 4106, Copolymer Rubber and Chemical Corporation). The degree of graft was 4.5.

EXAMPLE 8

Same as Example 6, except the rubber used was a 2.75 RSV, 60/40 (molar ratio) ethylene-propylene EPM (EPsyn 7006, Copolymer Rubber and Chemical Corporation). The degree of graft was 0.62.

EXAMPLE 9

Same as Example 8, except 4.8 gms of glycidyl acrylate was used instead of 4.2 gms of glycidyl methacrylate and 0.48 gms (instead of 0.42 gms) of 2,5-dimethyl-2,5 di(t-butylperoxy) hexane was used.

EXAMPLE 10

Same as Example 8, except 3.6 gms of glycidyl acrylate was used instead of 4.2 gms of glycidyl methacrylate and 0.36 gms (instead of 0.42 gms) of 2,5-dimethyl-2,5 di(t-butylperoxy) hexane was used.

EXAMPLE 11

Same as Example 7, except allyl glycidyl ether was used instead of glycidyl methacrylate.

EXAMPLE 12

Same as Example 11, except a 2.2 RSV, 66/34 (molar ratio) ethylene/propylene, 8 weight percent ethylidene norbornene EPDM (EPsyn 55, Copolymer Rubber and Chemical Corporation) was used instead of the rubber stated in Example 11.

EXAMPLE 13

Same as Example 9, except 4.2 gms (instead of 4.8 gms) of glycidyl acrylate and 0.21 gms (instead of 0.48 gms) of 2,5-dimethyl-2,5 di(t-butylperoxy) hexane were used.

EXAMPLES 14 THROUGH 26

Products of Examples 1 through 13 were blended (20%) with polybutylene terephthalate—VALOX 315 (General Electric Company) (80%) and the blends were injection molded into test specimens for tensile and impact strengths, as heretofore described.

CONTROL I

Control I is unmodified VALOX 315.

CONTROL II

Control II is an 80/20 blend of VALOX 315 and the starting rubber of Example 1.

CONTROL III

Control III is the same as Example 5 except the modifier was prepared by grafting in solution.

Table I summarizes the data on Examples 1 through 26 and Controls I, II and III.

TABLE I

| | Modifiers and Blends | | | | | Properties of 20% Modifier/80% Valox 315 Blends | | | |
|---|---|---|---|---|---|---|---|---|---|
| | Modifier | | | | | | Izod Impact Strength, Ft. Lbs./Inch | | |
| | | Diene* | | | | Tensile | | | Unnotched |
| | | Name, Weight | Graft | | Gel | Strength | Notched | | Knitline |
| Example | Source | (%) | Monomer ** | D.O.G. *** | (%) | (psi) | 25° C. | −20° C. | @ 25° C. |
| Control I | — | — | — | — | — | 7020 | 0.8 | 0.5 | 32 |
| Control II | EPsyne ® 55 | EN,8 | — | — | 0 | 3940 | 1.8 | 1.3 | — |
| Control III | **** | EN,8 | GMA | 2.8 | 3 | 4050 | 16 | 2.8 | 2.2 |
| 14 | Example 1 | EN,8 | GMA | 5.86 | 17 | 4390 | 15.4 | 4.6 | 15.2 |
| 15 | Example 2 | EN,8 | GMA | 4.03 | 14 | 3930 | 14.4 | 3.0 | — |
| 16 | Example 3 | EN,8 | GMA | 2.5 | 12 | 4030 | 3.8 | — | — |
| 17 | Example 4 | EN,4.5 | GMA | 4.8 | 65 | 4160 | 10.9 | 3.3 | — |
| 18 | Example 5 | EN,4.5 | GMA | 4.2 | 11 | 4410 | 17.5 | 3.5 | 13.7 |
| 19 | Example 6 | EN,8 | GMA | 4.5 | — | 4150 | 12.7 | 2.7 | — |
| 20 | Example 7 | VN,0.5 | GMA | 4.5 | — | 4610 | 13.4 | 3.3 | — |
| 21 | Example 8 | 0 | GMA | 0.6 | — | — | 2.7 | — | — |
| 22 | Example 9(a) | 0 | GA | — | — | — | 4.2 | — | — |
| 23 | Example 10 | 0 | AGE | — | — | — | 1.1 | — | — |
| 24 | Example 11 | VN,0.5 | AGE | — | — | — | 1.0 | — | — |
| 25 | Example 12 | EN,8 | AGE | — | — | — | 0.6 | — | — |
| 26 | Example 13(b) | 0 | GA | — | — | 4620 | 13.8 | 3.8 | — |

*Diene Content of the base rubber is given here. EN: Ethylidene norbornene, VN: Vinyl norbornene.
**AGE: Allyl glycidyl ether, GA: Glycidyl acrylate, GMA: Glycidyl methacrylate.
***D.O.G.: Degree of graft.
****See Control III description for details.
(a)Initiator level: 0.8 parts per 100 parts of rubber.
(b)Initiator level: 0.35 parts per 100 parts of rubber.

The foregoing examples are believed to demonstrate the improved utility of the bulk polymerization process for preparing (ethylene-mono-olefin) (ethylene-propylene) EPM or EPDM (ethylene-propylene-polyene) based impact modifiers for blending by dispersion in thermoplastic matrix resins, such as the polyester or polyamide resins.

It will be apparent that the bulk polymerization process of this invention results in degrees of graft (DOG) and gel values outside the domain of the solution polymerization processes of the copending applications:

| Process | DOG % | Gel % |
|---|---|---|
| Solution | less 2.8 | less 5 |
| Bulk | up to 8 | 5-100 and preferably 7-65 |

Glycidyl methacrylate grafted EPDM and glycidyl acrylate EPM give comparable properties in polyester blends if the graft polymers are prepared by the bulk polymerization process of this invention. If instead the modifier were prepared by solution polymerization, glycidyl acrylate grafted polymers result in much inferior properties.

Polyester matrix resin blended with a modifier having a low degree of graft, such as below 2.5%, has inferior notched Izod impact strength. 2.5% gel appears to be the lower limit for degree of graft in the modifier (Example 16).

The amount of initiator used in the preparation of glycidyl grafted EPM polymers has a noticeable effect on the impact strength of polyester blends (see Examples 22 and 26).

Unlike the blends formed with modifiers prepared by solution polymerization, the blends prepared from modifiers prepared by bulk polymerization give good knitline impact strength such as values greater than 14 compared to values of less than 4.

EXAMPLE 27

EPsyn® 55 was fed into a twin screw extruder (Werner & Pfleiderer's ZSK-30, 12 barrels) at the rate of 4.6 lbs/hr. A 10/1 mixture of glycidyl methacrylate/2,5-dimethyl 1-2,5 di(t-butylperoxy) hexane was fed at the rate of 0.385 lbs/hr in barrel 3 of the extruder. The extrudate was cooled in a water bath and pelletized. The properties of the pellets were as follows: DOG 5.86, graft efficiency 82%, gel 17%. The pellets (20%) were blended with polybutylene terephthalate (VALOX 315, 80%), extruded and injection molded into test specimens for physical properties. The physical properties were: tensile strength 4390 psi, elongation 43%, flexural modulus 210,130 psi, Rockwell hardness R96, notched Izod impact strengths 15.4 and 4.6 ft. lbs/inch at 25° C. and −20° C. respectively, unnotched knitline impact strength 13.0 ft. lbs/inch.

EXAMPLE 28

Same as Example 1, except the feed rates of rubber and monomer/initiator were 6.0 and 0.214 lbs/hr. respectively. The properties of pellets were as follows: DOG 2.5, graft efficiency 79%, gel 12%. The physical properties of the blend with VALOX 315 were as follows: tensile strength 4030 psi, elongation 50%, flexural modulus 194,600 psi, notched Izod impact strength 3.8 ft. lbs/inch at 25° C.

EXAMPLE 29

The base rubber is the EPDM of Example 1. The rubber feed rate was 6.6 lbs/hr to a Werner & Phleiderer ZSK twin screw extruder operating at a barrel temperature of 200° C. and a screw speed of 150 rpm. Glycidyl methacrylate initiator and 2,5-dimethyl-2,5-di(t-butylperoxy) hexane were fed continuously at rates of 7.6 parts per hundred GMA and 0.30 parts per hundred initiator per 100 parts by weight EPDM. The resulting reaction product had a gel content of 5%.

It will be seen from the above that (a) the graft efficiency remains relatively unchanged regardless of the amount of glycidyl methacrylate charge level, and (b) a substantial drop in impact strength (from 15.4 to 3.8) occurs at the lower DOG and gel level.

It will be understood that changes may be made in the details of formulation and operation, without departing from the spirit of the invention, especially as defined in the following claims.

What is claimed is:

1. A modifier for improving the impact and knitline strength of polyester or polyamide resins in which it is dispersed comprising the product of a reaction in bulk at elevated temperature in the molten state and in the presence of (1) a peroxide catalyst of (2) an elastomeric backbone polymer selected from the group consisting of (a) a copolymer rubber formed by copolymerization of ethylene and one or more mono-olefins containing 3-16 carbon atoms and (b) an interpolymer rubber formed by interoplymerization of ethylene, one or more $C_3$–$C_{16}$ mono-olefins, and a polyene and (3) a free radical polymerizable ethylenically unsaturated monomer having an epoxy functionality, wherein said bulk reaction product has a gel content greater than 5 percent, an epoxy functionality within the range of 2.5-13.0 per 1000 carbon atoms and degree of graft of at least 2.5%.

2. A modifier as claimed in claim 1, in which the bulk reaction has gel content within the range of 7-65 percent.

3. A modifier as claimed in claim 1, in which the backbone rubber contains 2-20 carbon-to-carbon double bonds per 1000 carbon atoms.

4. A modifier as claimed in claim 1, in which the epoxy functional monomer is characterized by the general formula

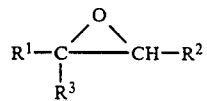

wherein $R^3$ is hydrogen or methyl, $R^2$ is hydrogen or alkyl of 1-6 carbon atoms ad $R^1$ is an alkylene having 1-10 carbon atoms.

5. A modifier as claimed in claim 1, in which the monomer is selected from the group consisting of glycidyl acrylate and glycidyl methacrylate.

6. A modifier as claimed in claim 1, in which the interpolymer rubber is an interpolymer of ethylene, propylene, and 5-ethylidene-2-norbornene.

7. A modifier as claimed in claim 1, in which the copolymer rubber is a copolymer of ethylene and propylene.

8. A modifier as claimed in claim 7, in which the ethylene and propylene are present in the bound state in the ratio of 10-95 moles ethylene to 95-5 moles propylene.

9. A modifier as claimed in claim 1, in which the monomer is present in an amount to provide 2.5-13 epoxy functionalities per 1000 carbon atoms in the bulk reaction product.

10. A modifier as claimed in claim 1, in which the peroxide catalyst is employed in an amount within the range of about 0.3-3.0 parts by weight per 100 parts by weight of the backbone rubber.

11. The method of producing a modifier for improving the impact and knitline strength of polyester or polyamide resins upon admixture therewith comprising bulk reaction at elevated temperatures in the molten state in the presence of a peroxide catalyst of an elastomeric backbone polymer selected from the group consisting of a copolymer rubber formed by the copolymerization of ethylene and one or more mono-olefins containing 3-16 carbon atoms and an interpolymer rubber formed by interpolymerization of ethylene, one or more $C_3$–$C_{16}$ mono-olefins and a polyene, and a free radical polymerizable ethylenically unsaturated monomer having an epoxy functionality, wherein said bulk reaction product has a gel content greater than 5%, an epoxy functionality greater than 2.5 per 1000 carbon atoms and a degree of graft of at least 2.5%.

12. The method as claimed in claim 11, in which the ingredients are reacted in bulk in a single step in melt processing equipment.

13. The method as claimed in claim 11, in which the bulk reaction is carried out at a temperature within the range of 350°-550° F.

14. The method as claimed in claim 11, in which the backbone rubber contains 2-20 carbon-to-carbon double bonds per 1000 carbon atoms.

15. The method as claimed in claim 11, in which the gel content of the reaction product is within the range of 7-65 percent.

16. The method as claimed in claim 11, in which the reaction product has epoxy functionalities within the range of 2.5-13.0 functionalities per 1000 carbon atoms.

17. The method as claimed in claim 11, in which the monomer is an alpha-beta ethylenically unsaturated compound.

18. The method as claimed in claim 17, in which the monomer is selected from the group consisting of glycidyl acrylate and glycidyl methacrylate.

19. A modifier as claimed in claim 1, in which the degree of graft is within the range of 2.5-8.

20. The method as claimed in claim 11, in which the degree of graft is within the range of 2.5 to 8.

21. The method as claimed in claim 11, in which the peroxide catalyst is employed in an amount within the range of about 0.3-3.0 parts by weight per 100 parts by weight of the backbone rubber.

* * * * *

UNITED STATES PATENT AND TRADEMARK OFFICE
CERTIFICATE OF CORRECTION

PATENT NO. : 5,008,342
DATED : April 16, 1991
INVENTOR(S) : Shrikant V. Phadke

It is certified that error appears in the above-identified patent and that said Letters Patent is hereby corrected as shown below:

Column 16, Claim 2, Line 8, insert "a" after -- has --.

Column 16, Claim 4, Line 23, replace "ad" with -- and --.

Signed and Sealed this

Seventeenth Day of November, 1992

Attest:

DOUGLAS B. COMER

Attesting Officer

Acting Commissioner of Patents and Trademarks